(12) United States Patent
Seiler et al.

(10) Patent No.: US 11,200,065 B2
(45) Date of Patent: Dec. 14, 2021

(54) BOOT AUTHENTICATION

(71) Applicant: HEWLETT-PACKARD DEVELOPMENT COMPANY, L.P., Spring, TX (US)

(72) Inventors: Peter Seiler, Fort Collins, CO (US); Michael Kinney, Fort Collins, CO (US); Vinh Anh Nguyen, Fort Collins, CO (US); Aaron Romero, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,693

(22) PCT Filed: Dec. 15, 2017

(86) PCT No.: PCT/US2017/066739
§ 371 (c)(1),
(2) Date: Jul. 29, 2019

(87) PCT Pub. No.: WO2019/117951
PCT Pub. Date: Jun. 20, 2019

(65) Prior Publication Data
US 2019/0391817 A1 Dec. 26, 2019

(51) Int. Cl.
*G06F 9/44* (2018.01)
*G06F 9/4401* (2018.01)
*G06F 21/44* (2013.01)
*G06F 21/57* (2013.01)
*H04L 9/32* (2006.01)

(52) U.S. Cl.
CPC ............ *G06F 9/4401* (2013.01); *G06F 21/44* (2013.01); *G06F 21/572* (2013.01); *G06F 21/575* (2013.01); *H04L 9/3234* (2013.01); *G06F 2221/034* (2013.01)

(58) Field of Classification Search
CPC ...... G06F 9/4401; G06F 21/44; G06F 21/572; G06F 21/575; G06F 2221/034; G06F 9/44502; G06F 9/44508; G06F 1/24; G06F 9/44526; G06F 15/177; G06F 9/44514; G06F 9/44523; G06F 11/1417; G06F 9/44505; H04L 9/3234
See application file for complete search history.

(56) References Cited

U.S. PATENT DOCUMENTS 6,484,262 B1 11/2002 Herzi
6,684,326 B1 1/2004 Cromer et al.
(Continued)

OTHER PUBLICATIONS

Security Network Authentication Service, https://www.ibm.com/support/knowledgecenter/ssw_i5_54/rzakh/rzakh.pdf.

*Primary Examiner* — Zahid Choudhury
(74) *Attorney, Agent, or Firm* — Michael A. Dryja

(57) ABSTRACT

Examples associated with boot authentication are described. One example includes initiating a power on self-test (POST) phase of a boot of a system. Prior to initiating a driver execution environment phase of the POST phase, a network stack may be loaded for a network port. An encrypted key may be retrieved from a trusted component of the system. Boot of the system may be permitted to proceed upon establishing a connection with an authentication server, and authenticating the system to the authentication server based on the encrypted key.

19 Claims, 6 Drawing Sheets

(56) References Cited

U.S. PATENT DOCUMENTS

| | | |
|---|---|---|
| 7,093,124 B2 | 8/2006 | Girard |
| 8,028,172 B2 | 9/2011 | Hunter et al. |
| 2003/0084342 A1 | 5/2003 | Girard |
| 2012/0161924 A1 | 6/2012 | Lin |
| 2012/0203663 A1 | 8/2012 | Sinclair et al. |
| 2015/0089209 A1* | 3/2015 | Jacobs ............... G06F 21/572 |
| | | 713/1 |
| 2015/0121497 A1 | 4/2015 | Brossard et al. |

* cited by examiner

BOOT AUTHENTICATION

BACKGROUND

Computers and other computing devices are critical in the economy today. Security of these devices is a key concern to prevent harm to the expensive devices and the data thereon.

BRIEF DESCRIPTION OF THE DRAWINGS

The present application may be more fully appreciated in connection with the following detailed description taken in conjunction with the accompanying drawings.

DETAILED DESCRIPTION

Systems, methods, and equivalents associated with boot authentication are described. As mentioned above, it may be desirable for some devices to be configured to operate within a specific network or at a specific physical location. Additional security measures to, for example, prevent unauthorized users from operating devices may also be desirable. While some techniques may restrict access once the device is operating, these techniques may be bypassed if the basic input/output system (BIOS) of a device is compromised. As used herein, the term BIOS may also include other configuration systems and techniques, including, for example, unified extensible firmware interfaces (UEFI), and so forth.

Consequently, techniques disclosed herein may relate to preventing operation of devices when it is detected that the device cannot authenticate itself to an authentication server during a boot of the device, before the device BIOS has loaded instructions potentially vulnerable to certain types of attacks. This may be achieved by loading a network stack for a network port during a phase of booting a device without the availability of certain resources such as random access memory. If the authentication server is reachable, boot of the device may be allowed to proceed. Otherwise boot of the device may be prevented until the authentication server can be reached. This may secure the device and the data thereon from unauthorized access.

Figure 1:
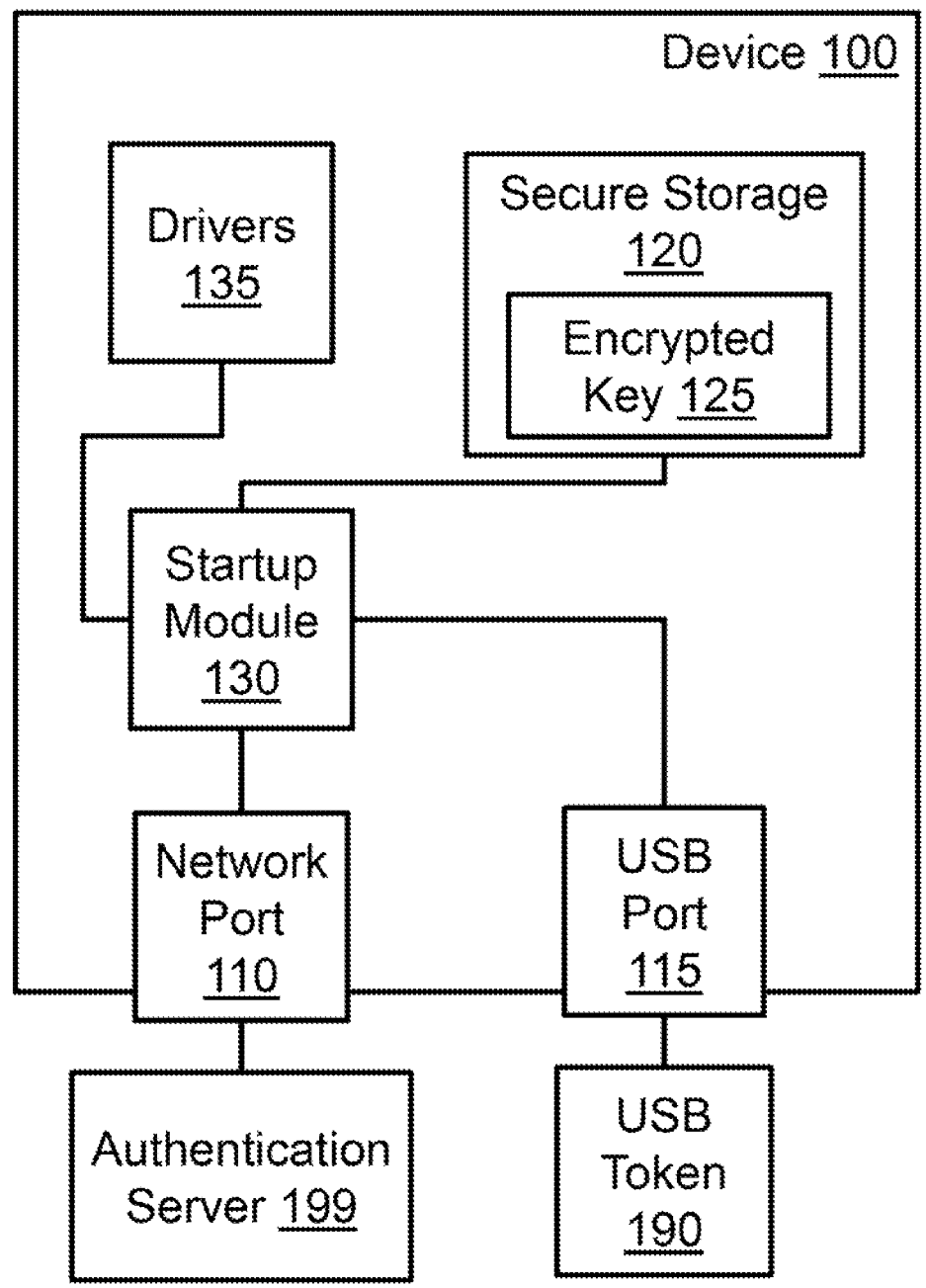
FIG. 1 illustrates an example device associated with boot authentication.

FIG. 1 illustrates an example device associated with boot authentication. It should be appreciated that the items depicted in FIG. 1 are illustrative examples, and many different systems, devices, and so forth, may operate in accordance with various examples.

FIG. 1 illustrates an example device 100 associated with boot authentication. Device 100 may be a device that is owned by a person or company that intends for the device to operate at a specific physical and/or network location. Thus, the entity responsible for device 100 may seek to ensure that device 100 is not removed from the location or that if it is, the data thereon remains secure. While techniques for securing device 100 after device 100 has booted up exist, some attacks may seek to compromise the device before device 100 has completed boot operations, thereby bypassing post boot security measures. Consequently, device 100 includes a startup module 130. Startup module 130 may perform various tasks associated with initiating device 100 and preparing device 100 for general operation. The startup tasks may include, for example, loading drivers and instructions associated with operating components of device 100, performing security checks to ensure proper operation of device 100, and so forth. In some examples, the startup tasks may be grouped into a variety of phases that are performed by components and/or using resources that are used to bring online and/or secure the next set of resources until device 100 is ready for use.

For example, some startup tasks associated with invoking configuration routines for a processor, chipset and motherboard may occur during a power on self-test (POST) phase of the startup process. The POST process may include a pre-extensible firmware interface (EFI), completion of which may initiate a driver execution environment (DXE) phase. During the DXE phase, random access memory (RAM) may become available and many other system components may be brought online using DXE drivers for those components.

However, as these components and/or component drivers may be compromised or otherwise vulnerable to attacks, it may be desirable to take precautions to prevent these components from being initiated if device 100 has been removed from an intended physical or network location of device 100.

Thus, prior to initiating the DXE phase, startup module 130 may activate certain components using trusted instructions to attempt to communicate with certain trusted external sources. These sources may include, for example, an authentication server 199, a universal serial bus (USB) token 190, and so forth. These trusted instructions may be obtained from drivers 135 that allow the operation of network port 110, USB port 115, and so forth. For example, the drivers 135 may include instructions that allow startup module 130 to run a network stack for network port 110.

In some examples, authenticating device 100 to authentication server 199 may involve an exchange of protected keys or secrets generated based on the protected keys. Thus, startup module 130 may also retrieve an encrypted key 125 from secure storage 120 to facilitate this exchange. In various examples, secure storage 120 may be a trusted platform module or other component configured to restrict access and modification opportunities for unauthorized processes. Once startup module 130 has obtained encrypted key 125, startup module 130 may then attempt to transmit encrypted key 125 or a secret generated based on encrypted key 125 to authentication server 199, USB token 190, and so forth. The external sources may then validate encrypted key 125 or the secret generated from encrypted key 125, and respond in appropriate manner to authenticate that device 100 is operating at an appropriate location, under the supervision of an authorized user, and so forth.

If a validation process fails, startup module 130 may take a variety of security actions to protect device 100, the data stored thereon, and so forth. The security action may include, for example, preventing the continued boot of device 100, erasing data stored on device 100, alerting authentication server 199 of the physical and/or network location of device 100, and so forth. In some examples, these actions may be tiered so that over time, as device 100 becomes more confident it is not in its appropriate location, stronger security measures are taken. For example, an initial failure to contact authentication server 199 may merely mean a network outage has occurred. However, repeated attempts to boot device 100 including a failure to contact authentication server 199 may indicate device 100 has been moved and actions should be taken to protect the data stored thereon. Thus, repeated attempts to boot device 100 may result in startup module 125 deleting data on device 100 to prevent unauthorized parties from accessing the data.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
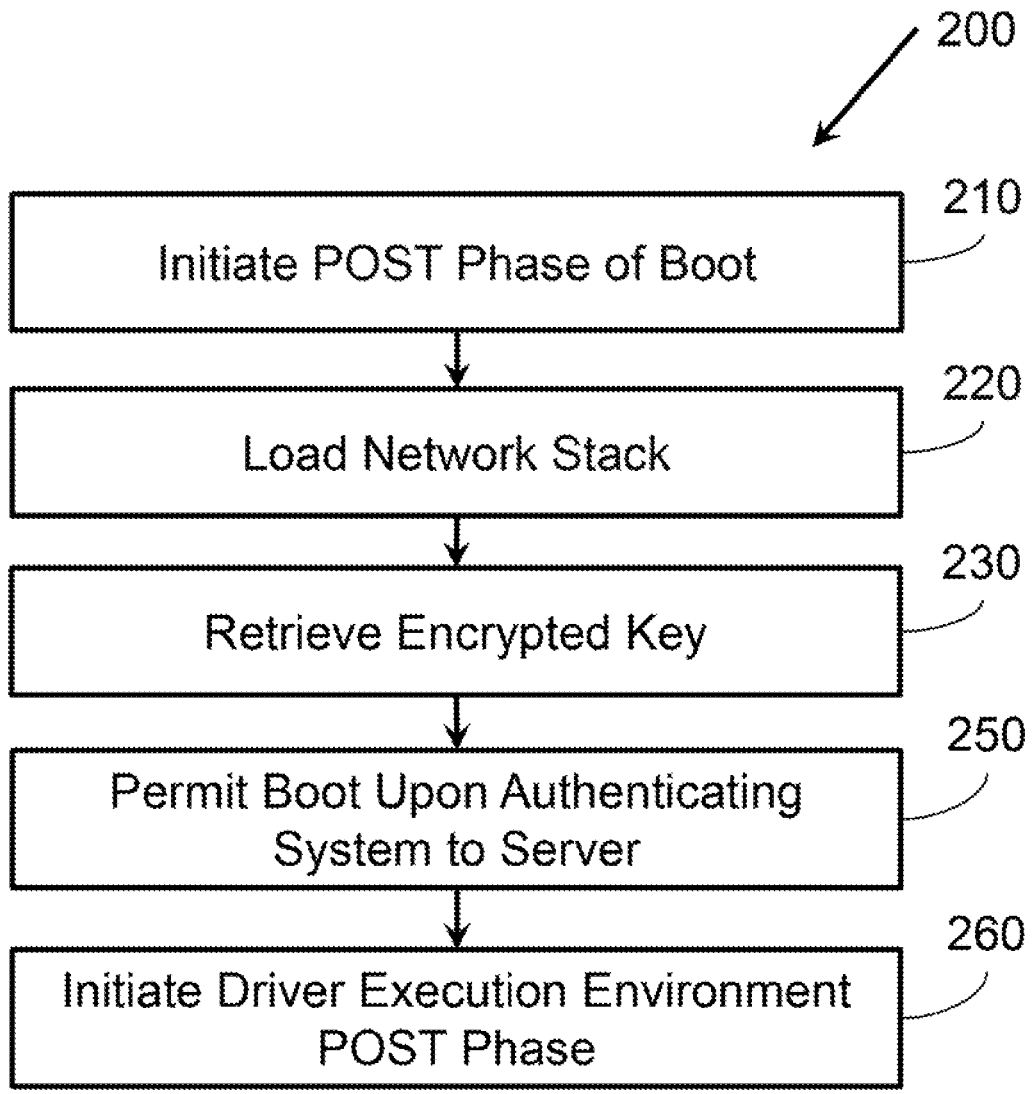
FIG. 2 illustrates a flowchart of example operations associated with boot authentication.

FIG. 2 illustrates an example method 200. Method 200 may be embodied on a non-transitory processor-readable medium storing processor-executable instructions. The instructions, when executed by a processor, may cause the processor to perform method 200. In other examples, method 200 may exist within logic gates and/or RAM of an application specific integrated circuit (ASIC).

Method 200 may perform various tasks associated with boot authentication. Method 200 includes initiating a power on self-test (POST) phase of a boot of a system at 210. Eventually, method 200 may reach a point of initiating a driver execution environment (DXE) phase of the POST process. The DXE phase may occur after certain security checks are made of various components and instructions to ensure the system will operate properly and securely. Prior to the initiation of the DXE phase, these components may not be accessible to the system, meaning certain resources (e.g., system random access memory (RAM)) may be unavailable.

Method 200 also includes loading a network stack at 220. The network stack may be associated with a network port of the system. Because the system RAM may be unavailable, the instructions associated with loading the network stack may be loaded into a central processing unit (CPU) cache for execution from the CPU cache.

Method 200 also includes retrieving an encrypted key at 230. The encrypted key may be retrieved from a trusted component of the system. The trusted component may be, for example, a trusted platform module, or another secure component of the system.

Method 200 also includes permitting a boot of the system to proceed at 250. The boot of the system may be permitted upon establishing a connection with an authentication server and authenticating the system to the authentication server based on the encrypted key. Authenticating to the authentication server may involve a variety of key exchange or other security techniques involving the encrypted key. In various examples, once boot of the system has been permitted, method 200 may proceed to action 260, and initiate a driver execution environment (DXE) phase of the POST process.

While loading the network stack at 220, retrieving the encrypted key at 230 and permitting boot of the system at 250 are illustrated as occurring after initiation of the POST phase, in some examples, these actions may occur during a pre-POST phase of the boot of the system. In these examples, these actions may be performed by a motherboard controller of the system. The motherboard controller may be, for example, a super I/O controller, an embedded controller, a baseboard management controller, a startup controller, a discrete controller, and so forth.

Figure 3:
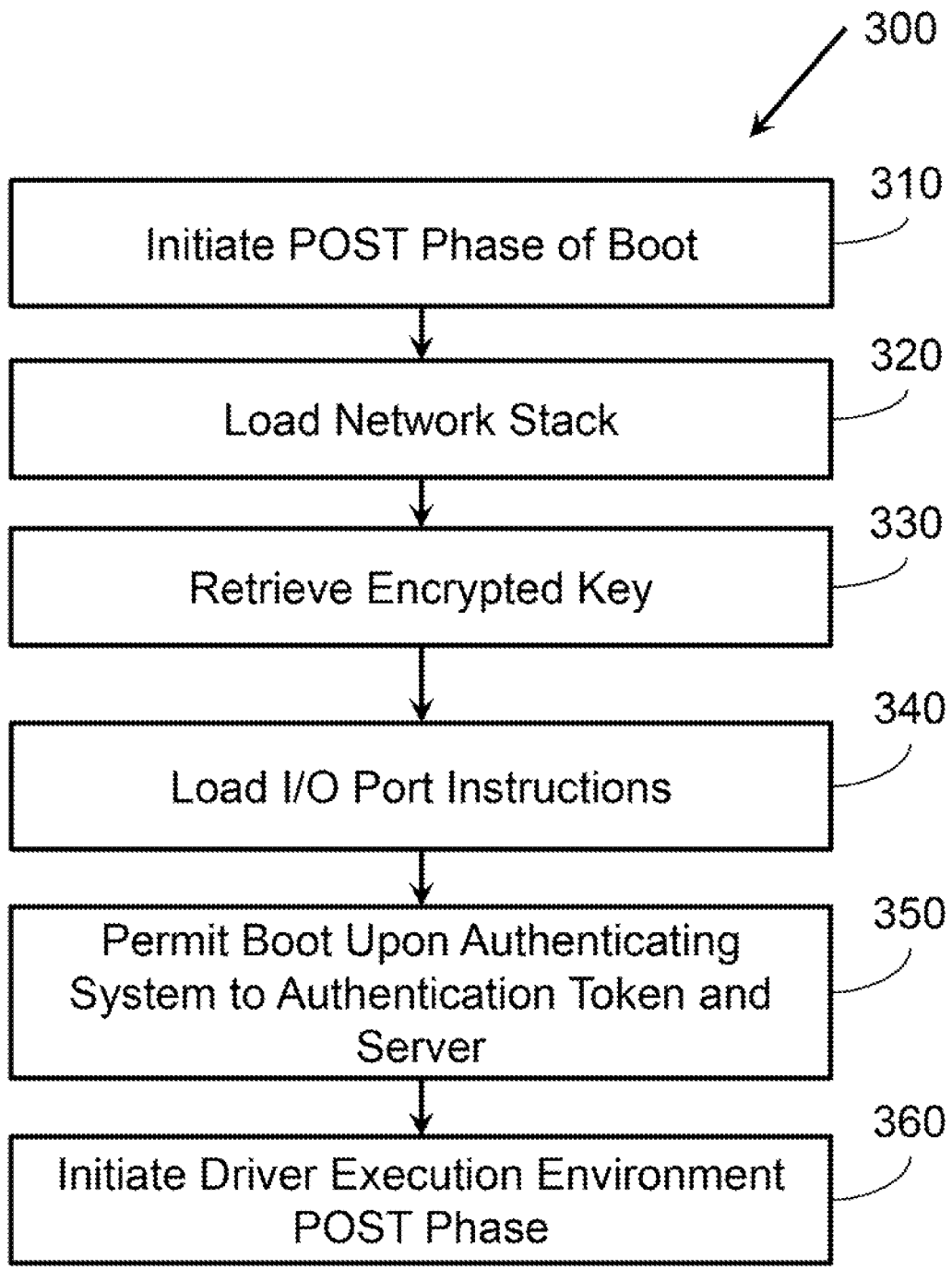
FIG. 3 illustrates another flowchart of example operations associated with boot authentication.

FIG. 3 illustrates a method 300 associated with boot authentication. Method 300 includes several actions similar to those described above with reference to method 200. For example, method 300 includes initiating a POST phase of a boot of a system at 310, loading a network stack at 320, retrieving an encrypted key at 330, permitting boot of the system to proceed at 350, and initiating a DXE post phase at 360.

Method 300 also includes loading instructions for operating an I/O port at 340. The I/O port may be, for example, a universal serial bus (USB) port, connected to a USB drive. The instructions may allow communication with an authentication token. In various examples, permitting the boot of the system to proceed at action 350 may also be based upon successfully authenticating the system based on the authentication token. This may be achieved by, for example, authenticating with the authentication server prior to authenticating with the authentication token, authenticating with the authentication token prior to authenticating with the authentication server, authenticating with the authentication token and the authentication server substantially in parallel, and so forth. The sequence used may depend, for example, on resource availability during the authentication process, security concerns, and so forth.

Figure 4:
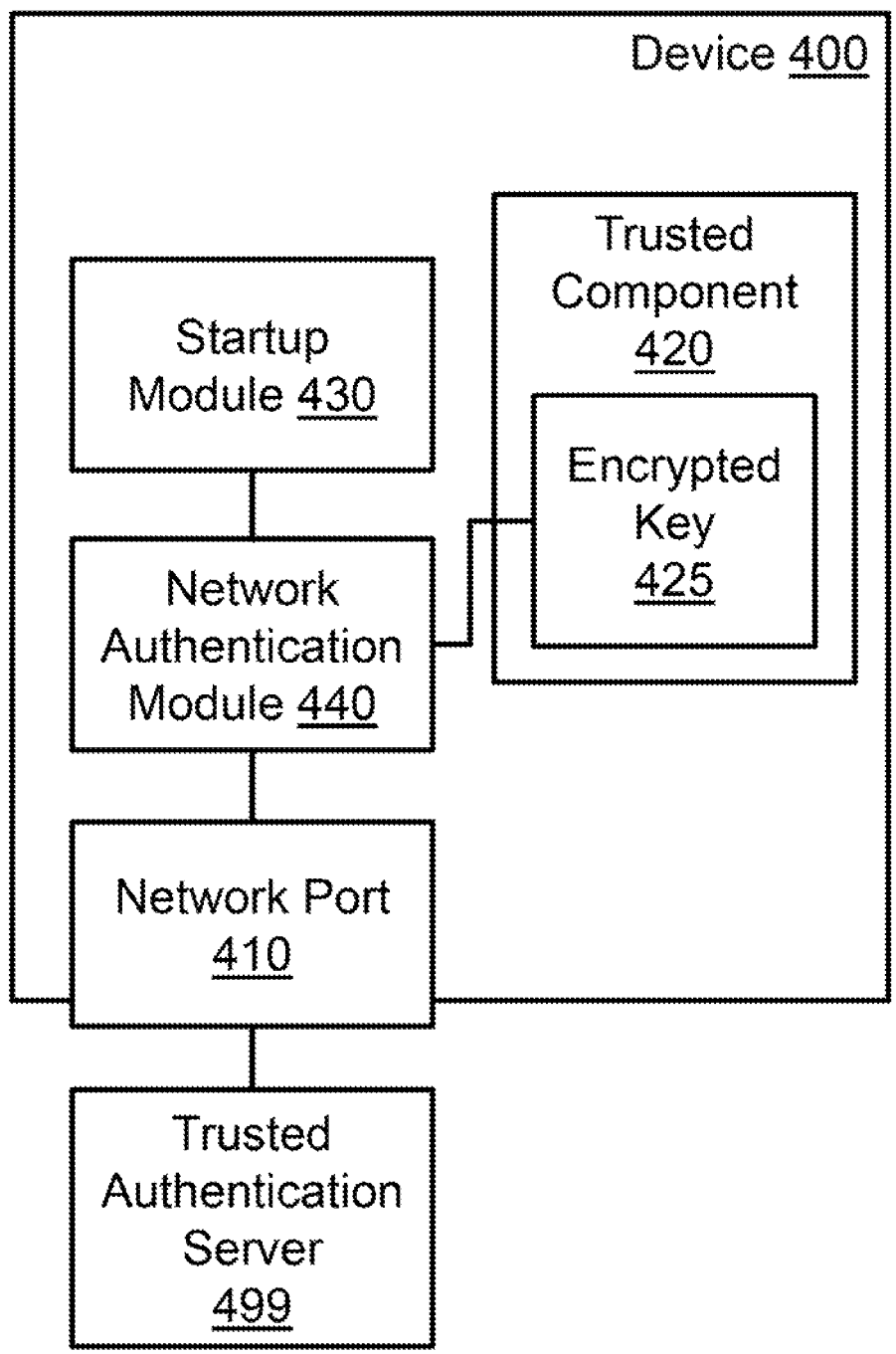
FIG. 4 illustrates another example device associated with boot authentication.

FIG. 4 illustrates a device 400. Device 400 may be, for example, a laptop, a desktop, a server, a mobile device, and so forth. Device 400 includes a network port 410. Device 400 also includes a trusted component 420. The trusted component may store an encrypted key 425. The trusted component may be, for example, a trusted platform module, or another type of secure memory with access permissions that hinder undesirable access and/or modification of the secure memory.

Device 400 also includes a startup module 430. Startup module 430 may control various aspects of a startup or boot process for device 400. For example, startup module 430 may control a basic input/output system (BIOS) of device 400 to initiate a power on self-test (POST) process during the startup of device 400.

Device 400 also includes a network authentication module 440. Network authentication module 440 may perform a variety of tasks during a pre-driver execution environment (DXE) phase of the POST process. Thus, network authentication module 440 may operate during a phase where access to resources of device 400 is limited. For example, network authentication module 440 may operate prior to initiation of a RAM of device 400, prior to initiation of a CPU cache of device 400, and so forth.

Network authentication module 440 may load a network stack for network port 410. Network authentication module 440 may also retrieve encrypted key 425 from trusted component 420. Using encrypted key 425 and the network stack, network authentication module 440 may initiate a process to authenticate device 400 to a trusted authentication server 499. If the authentication process succeeds, network authentication module 440 may allow startup module 430 to continue with the boot process. If the authentication process fails, network authentication module 440 may initiate a security procedure for device 400. In some examples, the security procedure may involve preventing device 400 from continuing with startup. In other examples, the security procedure may involve erasing data stored on device 400. Erasing data may occur if network authentication module 440 fails to authenticate the device to trusted authentication server 499 after, for example, a predefined number of authentication attempts, a predefined period of time, and so forth. In other examples, the security procedure may involve alerting trusted authentication server 499 of a failed authentication attempt by sending, information about a location of the device to trusted authentication server 499. The location may be, for example, a geographic location, a network location, and so forth.

In some examples, device 400 may also include a multi-factor authentication module (not shown). Prior to initiation of the DXE phase of the post process, the multifactor authentication module may load instructions for operating an I/O port associated with an authentication token. The multifactor authentication module may then initiate an authentication process involving the authentication token, and initiate a security procedure of device 400 if the authentication process involving the authentication token fails. As discussed above, the security procedure may involve preventing boot of device 400, erasing data from device 400, and so forth. Thus, where network authentication module 440 may check to ensure that device 400 is operating in an authorized location, the multifactor authentication module may check to ensure that device 400 is being operated by an authorized user.

Figure 5:
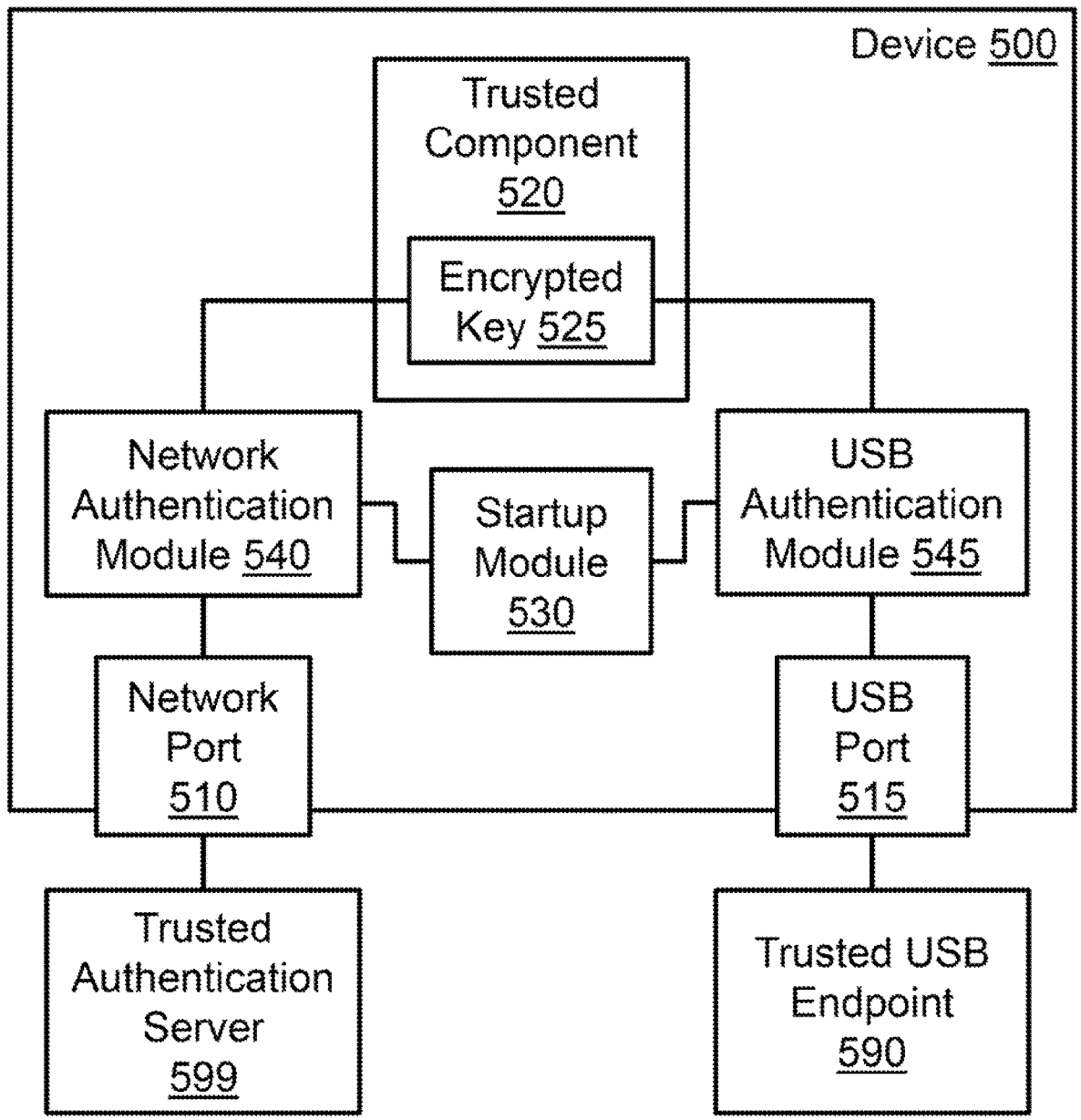
FIG. 5 illustrates another example device associated with boot authentication.

FIG. 5 illustrates a device 500 associated with boot authentication. Device 500 includes a network port 510 and a universal serial bus port 515. Device 500 also includes a trusted component 520. Trusted component 520 stores an encrypted key 525. As discussed above, trusted component 520 may be a trusted platform module, or some other secure component.

Device 500 also includes a network authentication module 540. Network authentication module 540 may load a network stack for network port 510. Network authentication module 540 may also retrieve encrypted key 525 from trusted component 520. Network authentication module 540 may also initiate a first authentication process between device 500 and a trusted authentication server 599. The first authentication process may use encrypted key 525 and occur via network port 510. If the first authentication process fails, network authentication module 540 may initiate a security procedure for device 500. The security procedure may include, preventing the boot of device 500, contacting trusted authentication server 599 with information about the location of device 500, erasing data from device 500, and so forth.

Device 500 also includes a USB authentication module 545. USB authentication module 545 may load a USB stack for USB port 515. USB authentication module 545 may also retrieve encrypted key 525 from trusted component 520 and initiate a second authentication process. The second authentication process may be between device 500 and a trusted USB endpoint 590 attached to device 500 via USB port 515. If the second authentication process fails. USB authentication module 545 may initiate a security procedure for device 500. In some examples, USB authentication module 545 may communicate with trusted USB endpoint 590 when trusted USB endpoint 590 is plugged into USB port 515. Trusted USB endpoint 590 may contain an authentication token to be validated by USB authentication 545 as a part of the second authentication process.

Device 500 also includes a startup module 530. Startup module 530 may control a basic input/output system (BIOS) of device 500 to initiate a power on self-test (POST) process during a startup process of device 500. The POST process may include initiating network authentication module 540. The POST process may also include initiating USB authentication module 545 when the first authentication process succeeds. The POST process may also include entering a driver execution environment phase of the POST process when the second authentication process succeeds.

Figure 6:
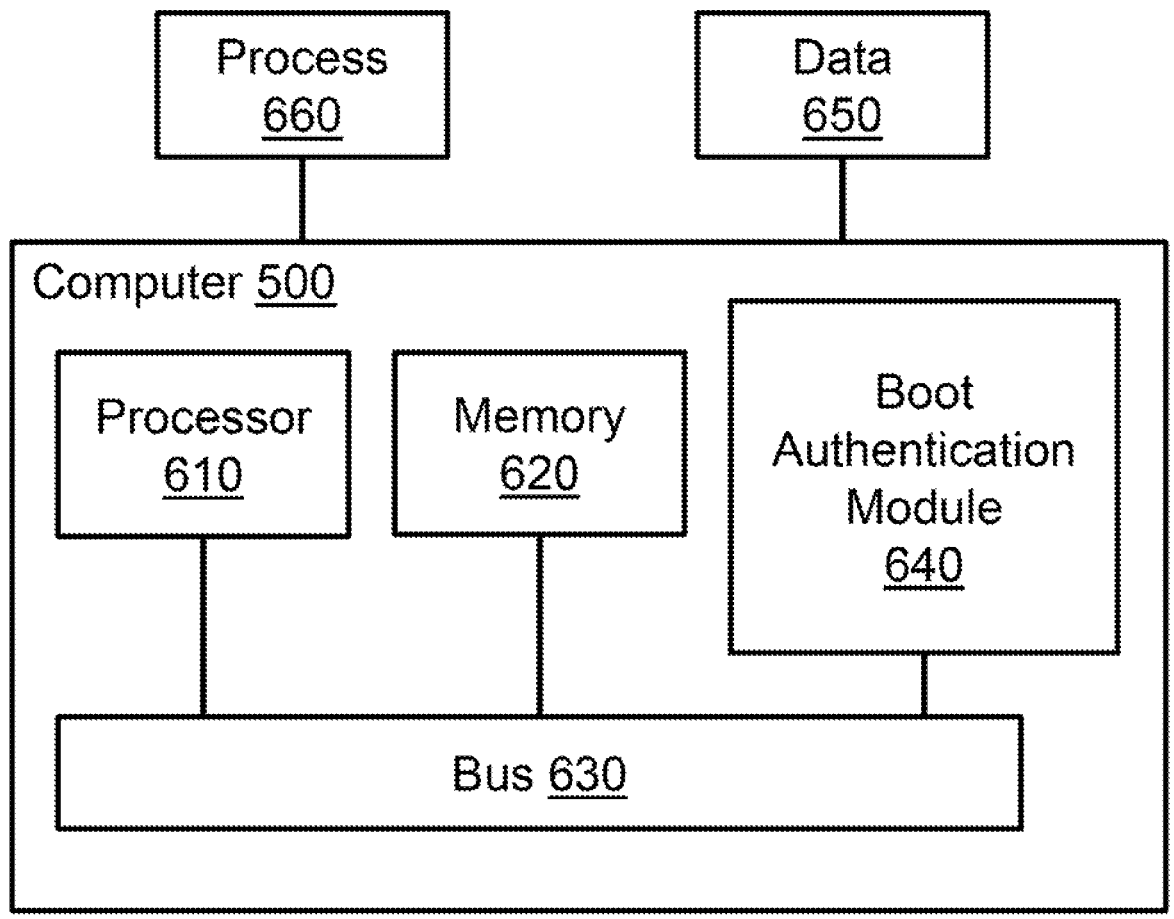
FIG. 6 illustrates an example computing device in which example systems, and methods, and equivalents, may operate.

FIG. 6 illustrates an example computing device in which example systems and methods, and equivalents, may operate. The example computing device may be a computer 600 that includes a processor 610 and a memory 620 connected by a bus 630. Computer 600 includes a boot authentication module 640. Boot authentication module 640 may perform, alone or in combination, various functions described above with reference to the example systems, methods, and so forth. In different examples, boot authentication module 640 may be implemented as a non-transitory computer-readable medium storing processor-executable instructions, in hardware, software, firmware, an application specific integrated circuit, and/or combinations thereof.

The instructions may also be presented to computer 600 as data 650 and/or process 660 that are temporarily stored in memory 620 and then executed by processor 610. The processor 610 may be a variety of processors including dual microprocessor and other multi-processor architectures. Memory 620 may include non-volatile memory (e.g., read-only memory) and/or volatile memory (e.g., random access memory). Memory 620 may also be, for example, a magnetic disk drive, a solid state disk drive, a floppy disk drive, a tape drive, a flash memory card, an optical disk, and so on. Thus, memory 620 may store process 660 and/or data 650. Computer 600 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A non-transitory computer-readable medium storing processor executable instructions that when executed control a processor to:
    initiate a power on self-test (POST) phase of a boot of a system; and
    prior to initiating a driver execution environment phase of the POST phase and prior to completion of the POST phase:
        load a network stack for a network port;
        retrieve an encrypted key from a trusted component of the system; and
        permit the boot of the system to proceed upon establishing a connection with an authentication server and authenticating the system to the authentication server based on the encrypted key.

2. The non-transitory computer-readable medium of claim 1, where authenticating the system to the authentication server is completed during a pre-POST phase of the boot of the system by a motherboard controller of the system.

3. The non-transitory computer-readable medium of claim 1, where authenticating the system to the authentication server is completed during the POST phase of the boot of the system prior to availability of a random access memory (RAM) of the system.

4. The non-transitory computer-readable medium of claim 1, where instructions associated with loading the network stack are loaded into a central processing unit (CPU) cache.

5. The non-transitory computer-readable medium of claim 1, where the trusted component of the system is a trusted platform module.

6. The non-transitory computer-readable medium of claim 1, where the instructions further control the processor to:
load instructions for operating an I/O port associated with communicating with an authentication token; and
permit the boot of the system to proceed upon successfully authenticating the system based on the authentication token.

7. The non-transitory computer-readable medium of claim 1, where the instructions further control the processor to:
load instructions for operating an I/O port associated with communicating with an authentication token; and
permit the loading of the network stack upon successfully authenticating the system based on the authentication token.

8. The non-transitory computer-readable medium of claim 1, wherein authenticating the system to the authentication server based on the encrypted key comprises:
transmitting the encrypted key to the authentication server; and
receiving a response from the authentication server indicating whether the authentication server has validated the encrypted key.

9. The non-transitory computer-readable medium of claim 1, wherein authenticating the system to the authentication server based on the encrypted key comprises:
generating a secret based on the encrypted key;
transmitting the generated secret to the authentication server; and
receiving a response from the authentication server indicating whether the authentication server has validated the generated secret.

10. The non-transitory computer-readable data storage medium of claim 1, wherein the processor is to permit the boot of the system to proceed upon establishing the connection with the authentication server and authentication of the system by:
continuing and completing the POST phase of the boot of the system.

11. The non-transitory computer-readable data storage medium of claim 10, wherein continuing and completing the POST phase of the boot of the system comprises:
proceeding to initiate the driver execution environment phase of the POST phase.

12. A device comprising:
a network port;
a trusted component storing an encrypted key;
a startup module to control, during a startup of the device, a basic input/output system (BIOS) of the device to initiate a power on self-test (POST) process; and
a network authentication module to, prior to entering a driver execution environment phase of the POST process and prior to completion of the POST process, load a network stack for the network port, to retrieve the encrypted key from the trusted component, and to initiate a security procedure for the device if the network authentication module fails to authenticate the device to a trusted authentication server using the encrypted key.

13. The device of claim 12, where the security procedure of the device is prevention of device startup.

14. The device of claim 12, where the security procedure is to erase data stored on the device if the network authentication module fails to authenticate the device to a trusted authentication server after one of a predefined number of authentication attempts, and a predefined period of time.

15. The device of claim 12, where the security procedure is to alert the trusted authentication server of a failed authentication attempt by sending information about a location of the device to the trusted authentication server.

16. The device of claim 12, comprising a multifactor authentication module to, prior to initiation of a driver execution environment phase of the POST process, load instructions for operating an I/O port associated with an authentication token, and initiate a security procedure of the device if the multifactor authentication module fails to authenticate the device based on the authentication token.

17. The device of claim 12, where the network authentication module operates prior to initiation of the CPU cache.

18. A device comprising:
a network port;
a universal serial bus (USB) port;
a trusted component storing an encrypted key;
an network authentication module to load a network stack for the network port, to retrieve the encrypted key from the trusted component, to initiate a first authentication process between the device and a trusted authentication server using the encrypted key via the network port, and to initiate a security procedure for the device when the first authentication process fails;
a USB authentication module to load a USB stack for the USB port, to retrieve the encrypted key from the trusted component, to initiate a second authentication process between the device and a trusted USB endpoint attached to the device via the USB port, and to initiate a security procedure for the device when the second authentication process fails;
a startup module to control, during a startup of the device, a basic input/output system (BIOS) of the device to initiate a power on self-test (POST) process, where the POST process includes initiating the network authentication module to complete the first authentication process prior to completion of the POST process, initiating the USB authentication module when the first authentication process succeeds, and entering a driver execution environment phase of the POST process when the second authentication process succeeds.

19. The device of claim 18 where the USB authentication module communicates with the trusted USB endpoint plugged into the USB port, and the trusted USB endpoint contains an authentication token to be validated by the USB authentication module as a part of the second authentication process.

* * * * *